United States Patent [19]

Stadler et al.

[11] Patent Number: 4,938,301

[45] Date of Patent: Jul. 3, 1990

[54] ELECTRONIC BALANCE WITH SCALE ON TOP

[75] Inventors: Eberhard Stadler; Matthias Eger, both of Göttingen; Gottfried Nolte, Bovenden; Eberhard Lübke, Hardegsen, all of Fed. Rep. of Germany

[73] Assignee: Sartorius GmbH, Göttingen, Fed. Rep. of Germany

[21] Appl. No.: 433,264

[22] Filed: Nov. 8, 1989

[30] Foreign Application Priority Data

Nov. 17, 1988 [DE] Fed. Rep. of Germany ....... 3838906

[51] Int. Cl.$^5$ .......................... G01G 7/00; G01G 1/18
[52] U.S. Cl. ..................................... 177/212; 177/246
[58] Field of Search .................................. 177/212, 246

[56] References Cited

U.S. PATENT DOCUMENTS

| | | | |
|---|---|---|---|
| 4,382,480 | 5/1983 | Knothe et al. | 177/212 |
| 4,656,599 | 4/1987 | Knothe et al. | 177/212 X |
| 4,825,968 | 5/1989 | Maaz et al. | 177/212 |

*Primary Examiner*—George H. Miller, Jr.
*Attorney, Agent, or Firm*—Eric P. Schellin

[57] ABSTRACT

In an electronic balance with a scale on top with two guide rods which connect a load receiver to a system carrier fixed to the housing as parallel guide, with at least one translation lever which is connected to the system carrier by means of two springs and with a coupling element (9) which transfers the force corresponding to the mass of the weighed material from the load receiver to the shorter lever arm of the translation lever while the counteracting force imposes on the longer lever arm of the translation lever. The two springs and the coupling element (9) are connected to each other by a common cross piece (8) and consist of a single sheet of metal, whereby the thickness of the sheet of metal is greater than the shorter lever arm of the translation lever and the material thickness is reduced in such a manner both in the area of the two springs and in the area of the coupling element (9) that the shorter lever arm is formed by an offset of the thin area (26) of the coupling element (9) produced in the longitudinal direction of the lever in relation to the thin areas (28) of the springs. The length of the shorter lever arm is determined only by the offset of the thin areas (26, 28) of the coupling element (9) and of the springs within the sheet thickness and can be very precisely manufactured by means of suitable manufacturing methods.

11 Claims, 3 Drawing Sheets

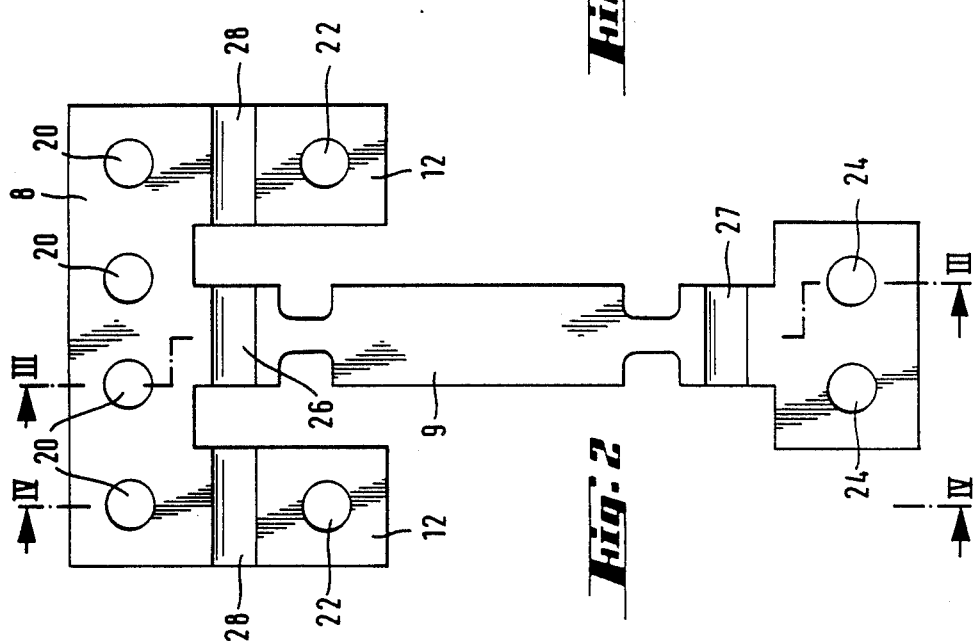
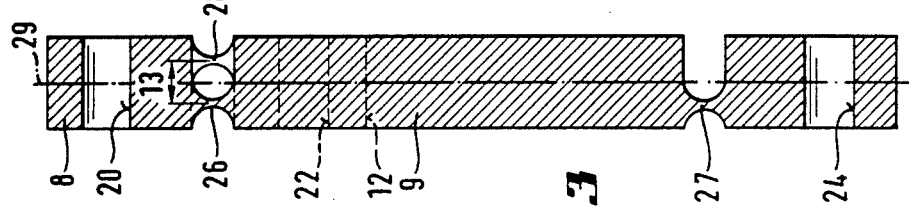
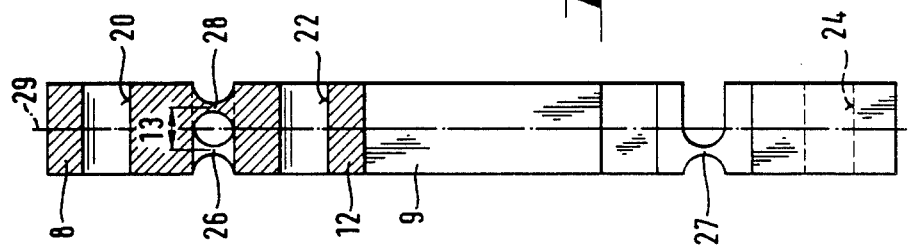

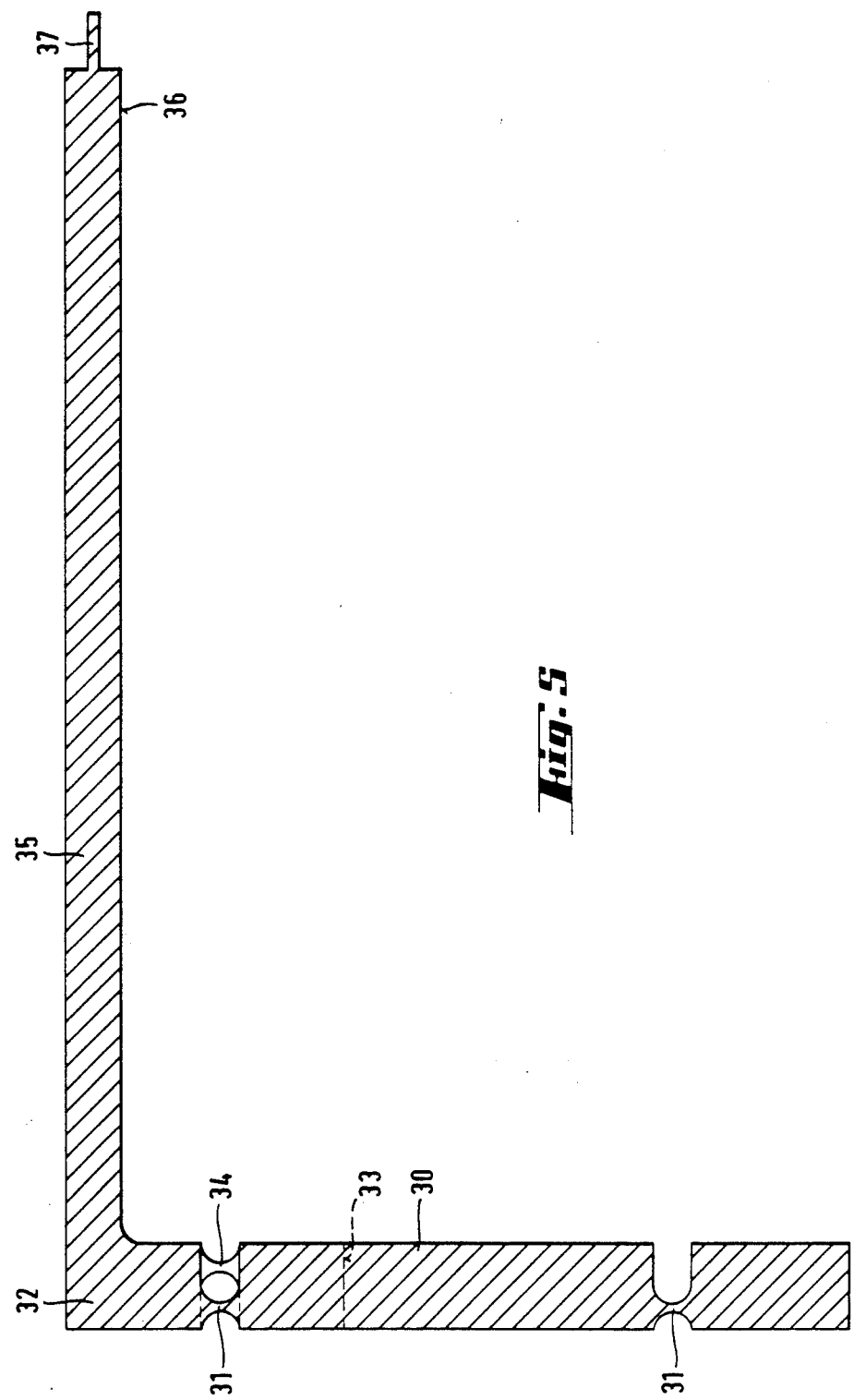

ELECTRONIC BALANCE WITH SCALE ON TOP

BACKGROUND OF THE INVENTION

The invention relates to an electronic balance with a scale on top having two guide rods which connect a load receiver to a system carrier fixed to the housing as parallel guide, with a translation lever which is connected to the system carrier by means of two springs and with a coupling element which transfers the force corresponding to the mass of the weighed material from the load receiver to the shorter lever arm of the translation lever while the counteracting force imposes on the longer lever arm of the translation lever.

Balances of this type are known e.g. from DE-OS 34 22 042.

In this known embodiment, the shorter lever arm is formed by the shaping of the translation lever and the springs and the coupling element are connected as separate parts by screws to the translation lever. This is disadvantageous on account of the plurality of parts, as tolerances add up and also, the assembly therefor is difficult.

The invention therefore has the problem of developing an electronic balance with scale on top of the type initially mentioned in such a manner that the number of parts is reduced and the stability of the length of the shorter lever arm of the translation lever is improved.

SUMMARY OF THE INVENTION

The invention solves this problem in that the two springs and the coupling element are connected to each other by a common cross piece and consist of a single sheet of metal; that the thickness of the sheet of metal is greater than the length of the shorter lever arm of the translation lever and that the material thickness is reduced in such a manner both in the area of the two springs and in the area of the coupling element; that the shorter lever arm is formed by an offset of the thin area of the coupling element produced in the longitudinal direction of the lever in relation to the thin areas of the spiral springs.

The relatively thick metal sheet without graduations results in good stability and permits the entire shorter lever arm of the translation lever to be housed within the thickness of the sheet. The length of the shorter lever arm is determined only by the offset of the thin areas of the coupling element and of the springs within the sheet thickness and can be very precisely manufactured by means of suitable manufacturing methods. In particular, no more screw connections enter into the length of the shorter lever arm; this eliminates one of the main causes for hysteresis and long-time drift in the area, which is highly loaded with force, and also, tolerances in the assembly no longer influence the length of the shorter lever arm.

BRIEF DESCRIPTION OF THE DRAWINGS

The invention is described in the following with reference made to the schematic figures.

FIG. 2 shows a front view of the coupling element, the two springs and the connecting cross piece.

FIG. 3 shows a section through the springs, coupling element and cross piece in the plane of the coupling element.

FIG. 4 shows a section through the springs, coupling element and cross piece in the plane of a spring.

FIG. 5 shows a second embodiment of the coupling element, the springs and of the cross piece with integrated, longer lever arm of the translation lever.

DETAILED DESCRIPTION OF THE INVENTION

Figure 1:
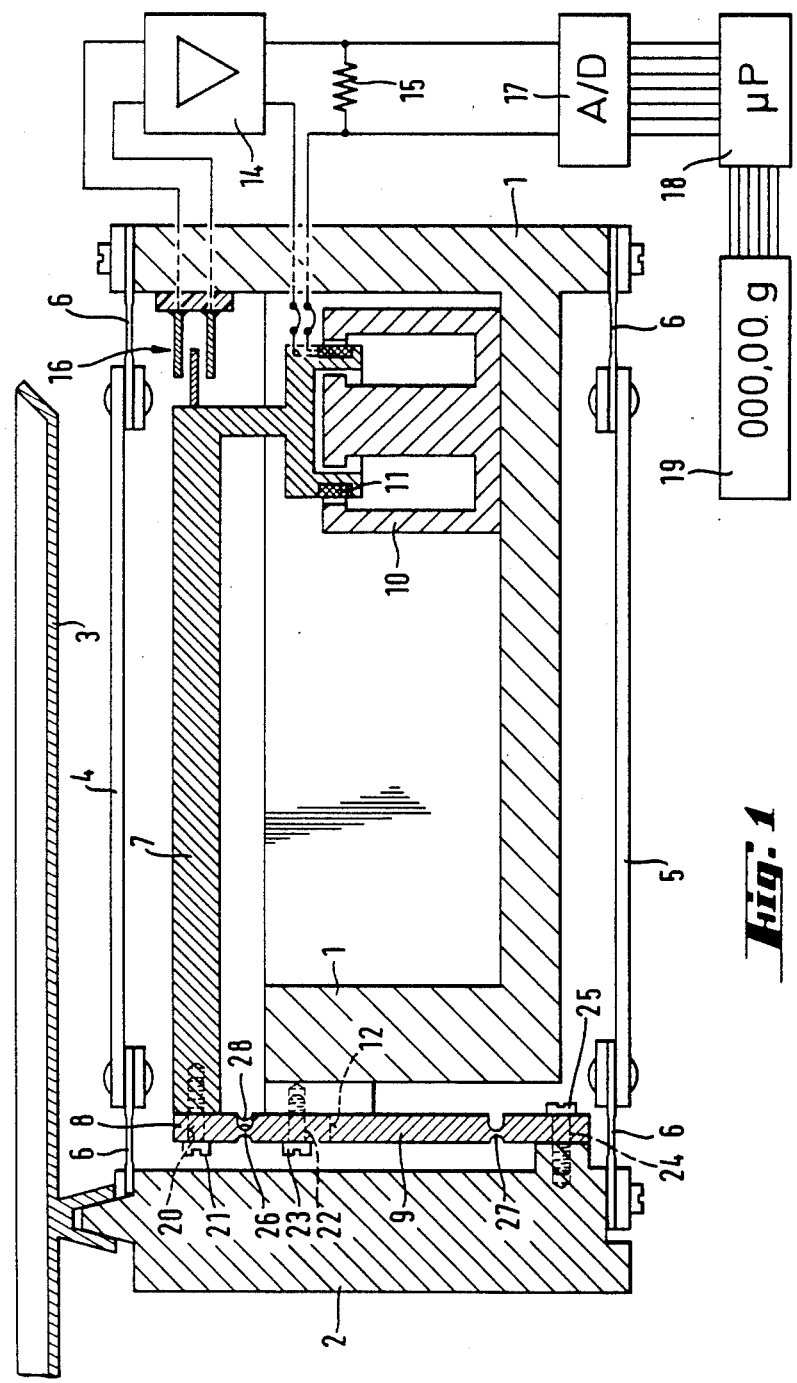
FIG. 1 shows a longitudinal section through the balance and a block wiring diagram of the associated electronic circuitry.

FIG. 1 shows the balance in longitudinal section and the associated electronic circuitry as a block wiring diagram. The housing of the balance with a scale on top has been omitted for the sake of clarity. The weighing system consists of a system carrier 1 to which a load receiver 2 is fastened in a vertically movable manner via two guide rods 4, 5 with moving joints 6. Load receiver 2 transfers the force corresponding to the mass of the material being weighed on balance scale 3 via coupling element 9, which is explained in more detail in the next paragraph, onto the shorter lever arm 8 of the translation lever. The translation lever is mounted by means of two springs 12, which are also explained in more detail in the next paragraph, on system carrier 1. A coil shell with coil 11 is fastened to the longer lever arm 7 of the translation lever. Coil 11 is located in the air gap of permanent magnet system 10 and generates the compensation force. The magnitude of the compensation current through coil 11 is regulated in a known manner by a position sensor 16 and an automatic gain control amplifier 14 in such a manner that equilibrium prevails between the weight of the material being weighed and the electromagnetically generated compensation force. The compensation current generates a measuring voltage on measuring resistor 15 which is supplied to analog-to-digital converter 17. The digitized result is assumed by digital signal processing unit 18 and digitally displayed in display 19.

The design of already-mentioned coupling element 9 and of the springs 12 can be more precisely recognized in FIGS. 2 to 4.

FIG. 2 is a front view, FIG. 3 a section along line III—III in FIG. 2 and FIG. 4 is a section along line IV—IV in FIG. 2. In FIGS. 3, 4 the metal sheet out of which coupling element 9, springs 12 and cross piece 8 were worked out is sketched thicker than it actually is for the sake of clarity. (Customary dimensions are: sheet thickness 2-5 mm, shorter lever arm 0.1-1 mm.) The contour of the two springs 12, of coupling element 9 and of cross piece 8, as can be recognized from FIG. 2, is manufactured e.g. by stamping out of a metal sheet, likewise perforations 20 in cross piece 8 for screwing to longer lever arm 7 of the translation lever ( by means of screws 21 in FIG. 1), perforations 22 in springs 12 for screwing to system carrier 1 (by means of screws 23 in FIG. 1) and perforations 24 in coupling element 9 for screwing to load receiver 2 (by means of screws 25 in FIG. 1). The two thin areas 26, 27 for coupling element 9, which form the actual moving joints, are manufactured e.g. by milling, eroding or stamping. In the same manner, each of the two springs 12 comprises a thin area 28. Thin areas 26, 27 on the one hand and 28 on the other hand are located at differing depths in the metal sheet. Thin areas 26, 27 are located in FIGS., 3, 4 to the left of the dotted median plane 29 of the sheet and thin areas 28 to the right of the median plane. The shorter lever arm of the translation lever is therewith given by this offset in depth of the thin areas and can be manufactured very precisely. A selection or a division into various classes can optionally be carried out by measuring this part prior to assembly.

In contrast thereto, longer lever arm 7 is loaded to a considerably lesser extent and therefore less critical as regards its stability and coupling. In addition, a considerably greater dimensional change must be induced for an equal relative change of lever arm than is the case for the shorter lever arm. Therefore, less than the four screws 21 shown are also frequently sufficient for fastening, so that cross piece 8 (FIG. 2) can comprise correspondingly fewer perforations 20. It is also possible to use another type of fastener such as e.g. adhesive.

It was previously assumed that part shown by reference numerals 8/9/12 is to be manufactured from a metal sheet. This part can of course also be manufactured with the thin areas as a cast or forged part or by hot-pressing. It is possible in this instance to integrate the longer lever arm of the translation lever (part 7 in FIG. 1) into the part for the shorter lever arm and the joints. This is shown in FIG. 5. Coupling element 30 with thin areas 31, cross piece 32 and springs 33 with thin areas 34 are designed in accordance with the first embodiment in FIGS. 1 to 4. In addition, extension 35 is formed onto cross piece 32 as a longer lever arm. In its rear area, this extension comprises screwing surface 36 for the coil of the electromagnetic compensation of force; movable part 37 for the position sensor is also integrated.

In the figures, thin areas 26, 31 of coupling element 9, 30 are sketched at the same vertical level as thin areas 28, 34 of springs 12, 33. However, this is not necessary; rather, a slight vertical offset can be provided. This is advantageous in some balance types for the adjustment of the corner-load freedom.

The mounting of further levers and their connection among each other in balances with two or more translation levers can also take place in a logical manner in the manner described.

What is claimed is:

1. An electronic balance with a scale on top with two guide rods which connect a load receiver to a system carrier fixed to a housing as parallel guides, with at least one translation lever which is connected to the system carrier by means of two springs and with a coupling element which transfers the force corresponding to the mass of the weighed material from the load receiver to a shorter lever arm of the translation lever while a counteracting force attacks a longer lever arm of the translation lever, characterized in that the two springs and the coupling element are connected to each other by a common cross piece and consist of a single sheet of metal, the thickness of the sheet of metal is greater than the length of the shorter lever arm of the translation lever and the material thickness is reduced in such a manner both in the area of the two springs and in the area of the coupling element, the shorter lever arm is formed by an offset of the thin area of the coupling element generated in the longitudinal direction of the lever in relation to the thin areas of the springs.

2. The electronic balance with scale on top according to claim 1, wherein the thin areas of the two springs are located somewhat behind the median plane of the metal sheet whereas the thin areas of the coupling element located somewhat in front of the median plane of the metal sheet.

3. The electronic balance with scale on top according to claim 2, wherein the thin areas are produced by milling.

4. The electronic balance with scale on top according to 2, wherein the thin areas are produced by eroding.

5. The electronic balance with scale on top according to claim 2, wherein the thin areas are produced by stamping.

6. The electronic balance with scale on top according to claim 2, wherein the metal sheet with the thin areas is designed as a cast part.

7. The electronic balance with scale on top according to claim 6, wherein the length of the shorter lever arm of the translation lever is no larger than 1 mm.

8. The electronic balance with scale on top according to claim 7, wherein the metal sheet is at least 2 mm thick.

9. The electronic balance with scale on top according to claim 8, wherein the metal sheet is screwed in the area of the cross piece to the longer lever arm of the translation lever.

10. The electronic balance with scale on top according to claim 9, wherein the metal sheet and the longer lever arm of the translation lever are integral.

11. The electronic balance with scale on top according to 10, wherein the thin area of the coupling element is offset in a vertical direction in relation to the thin areas of the springs.

* * * * *